(12) United States Patent
Germond et al.

(10) Patent No.: US 8,718,674 B2
(45) Date of Patent: May 6, 2014

(54) METHOD FOR LOCATING A SOURCE BY MULTI-CHANNEL ESTIMATION OF THE TDOA AND FDOA OF ITS MULTIPATH COMPONENTS WITH OR WITHOUT AOA

(75) Inventors: Cécile Germond, Paris (FR); Anne Ferreol, Colombes (FR)

(73) Assignee: THALES, Neuilly sur Seine (FR)

( * ) Notice: Subject to any disclaimer, the term of this patent is extended or adjusted under 35 U.S.C. 154(b) by 392 days.

(21) Appl. No.: 13/141,657

(22) PCT Filed: Dec. 11, 2009

(86) PCT No.: PCT/EP2009/067000
§ 371 (c)(1),
(2), (4) Date: Jul. 25, 2011

(87) PCT Pub. No.: WO2010/072593
PCT Pub. Date: Jul. 1, 2010

(65) Prior Publication Data
US 2012/0122470 A1       May 17, 2012

(30) Foreign Application Priority Data

Dec. 23, 2008  (FR) ..................... 08 07403

(51) Int. Cl.
*H04W 24/00*      (2009.01)
(52) U.S. Cl.
USPC ................... 455/456.1; 455/456.5; 455/456.6
(58) Field of Classification Search
USPC .................. 455/418, 456.1–456.6, 457, 13.3, 455/15–16, 63.1, 65, 67.11, 404.2, 422.1, 455/423–425, 434, 500–501, 504, 506–507, 455/517, 550.1, 556.2, 561; 701/445–447, 701/454–455, 465–472, 495, 516–517, 519, 701/482–485; 340/988–994; 348/113, 116, 348/135, 143
See application file for complete search history.

(56) References Cited

U.S. PATENT DOCUMENTS

| | | | |
|---|---|---|---|
| 3,863,257 A | | 1/1975 | Kang et al. |
| 6,710,743 B2 * | | 3/2004 | Benner et al. ................. 342/453 |
| 8,265,011 B2 * | | 9/2012 | Sugar et al. ................... 370/328 |

(Continued)

OTHER PUBLICATIONS

Belanger S P Ed—Institute of Electrical and Electonics Engineers: "Multipath TDOA and FDOA estimation using the EM algorithm," Plenary, Special, Audio, Underwater Acoustics, VLSI, Neutral Networks. Minneapolis, Apr. 27-30, 1993; [Proceedings of the International Conference on Acoustics, Speech, and Signal Processing (ICASSP)], New York, IEEE, US, vol. 4, Apr. 27, 1993, pp. 168-171.

(Continued)

*Primary Examiner* — Meless Zewdu
(74) *Attorney, Agent, or Firm* — Baker Hostetler LLP (57) ABSTRACT

A method and system for locating an emitter E transmitting a signal toward a receiver A comprising N radio frequency channels (N≥1), the characteristics of said signal being unknown to the receiver and said signal being reflected off P reflectors $B_i$ (P≥1) of known positions, includes a step of multi-channel joint estimation/detection of the time differences of arrival or TDOA $\tau_i$ and of the frequency differences of arrival or FDOA $f_i$ for each reflected path, a step of angular estimation of the direction $\theta_1$ of the direct path of the signal emitted by a goniometry procedure, and a step of location in the plane of the position (x,y) of the emitter E on the basis, at least, of the pairs $(\tau_i, f_i)$.

8 Claims, 7 Drawing Sheets

(56) References Cited

U.S. PATENT DOCUMENTS

| | | | |
|---|---|---|---|
| 2002/0196187 A1 | 12/2002 | Holt | |
| 2003/0058926 A1* | 3/2003 | Balakrishnan et al. | 375/146 |
| 2004/0017311 A1* | 1/2004 | Thomas et al. | 342/450 |
| 2005/0184907 A1* | 8/2005 | Hall et al. | 342/387 |
| 2005/0192026 A1* | 9/2005 | Carlson et al. | 455/456.1 |
| 2008/0186235 A1* | 8/2008 | Struckman et al. | 342/465 |
| 2009/0267836 A1* | 10/2009 | Falk | 342/378 |

OTHER PUBLICATIONS

Alex Mikhalev et al.: "Passive emitter goelocation using agent-based data fusion of AOA, TDOA and FDOA measurements," Information Fusion, 2007 10th International Conference on, IEEE, PI, Jul. 1, 2007, pp. 1-6.

Michaela C Vanderveen et al.: "Joint Angle and Delay Estimation (JADE) for Multipath Signals Arriving at an Antenna Array" IEEE Communications Letters, IEEE Service Center, Piscataway, NJ, US, vol. 1, No. 1, Jan. 1, 1997.

Yvon Erhel et al.: "An Operational HF System for Single Site Localization," Military Communications Conference, 2007. MILCOM 2007. IEEE, IEEE, Piscataway, NJ, USA, Oct. 29, 2007, pp. 1-5.

Chen, C.-K.; Gardner, W.A., "Signal-selective time-difference of arrival estimation for passive location of man-made signal sources in highly corruptive environments, Part II. Algorithms and performance," IEEE transactions on Signal Processing, vol. 40 n° May 5, 1992, pp. 1168-1184.

Drake, S; Dogancay, K, "Geolocation by time difference of arrival using hyperbolic asymptotes," ICASSP'04, vol. 2, pp. ii-361-ii-364, May 2004.

Gardner, W.A.; Chen, C.-K., "Signal-selective time-difference-of-arrival estimation for passive location of man-made signal sources in highly corruptive environments, Part I. Theory and method," IEEE transactions on Signal Processing, vol. 40 n° May 5, 1992, pp. 1168-1184.

Chen, C.-K.; Gardner, W.A., "Signal-selective time-difference of arrival estimation for passive location of man-made signal sources in highly corruptive environments, Part II. Algorithms and performance," IEEE transactions on Signal Processing, vol. 40 n° May 5, 1992, pp. 1185-1197.

D. Musicki, W. Koch, "Geolocation using TDOA and FDOA measurements," 11th International Conference on Information Fusion, 2008, pp. 1-8 , Jun. 30, 2008-Jul. 3, 2008.

R. O. Schmidt, "Multiple emitter location and signal parameter estimation," Antennas and Propagation, IEEE Transactions on, vol. 34, No. 3, pp. 276-280, Mar. 1986.

Y. Bertel; F. Marie, "An Operational HF System for Single Site Localization," Military Communications Conference MILCOM 2007, pp. 1-5, Oct. 2007.

Bienvenu, G.; Kopp, L., "Optimality of high resolution array processing using the eigensystem approach," Speech and Signal Processing, IEEE Transactions vol. 31, Issue 5, Oct. 1983 pp. 1235-1248.

* cited by examiner

METHOD FOR LOCATING A SOURCE BY MULTI-CHANNEL ESTIMATION OF THE TDOA AND FDOA OF ITS MULTIPATH COMPONENTS WITH OR WITHOUT AOA

CROSS-REFERENCE TO RELATED APPLICATIONS

This application is a National Stage of International patent application PCT/EP2009/067000, filed on Dec. 11, 2009, which claims priority to foreign French patent application No. FR 08 07403, filed on Dec. 23, 2008, the disclosures of which are incorporated by reference in their entirety.

FIELD OF THE INVENTION

Figure 1:
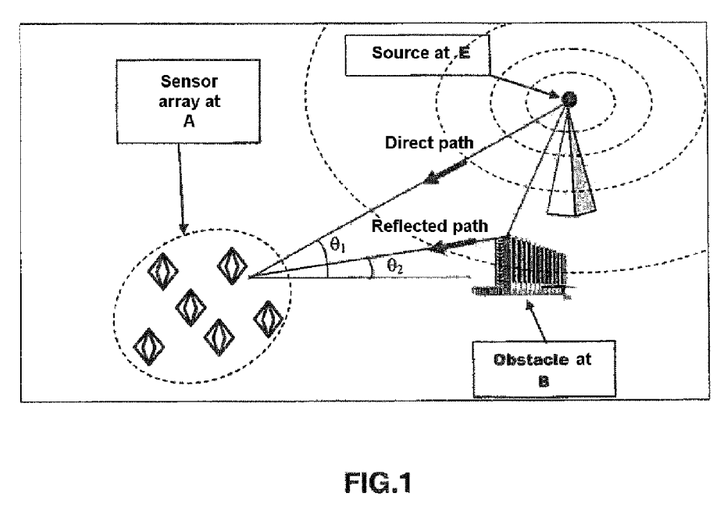

The invention relates to a method for locating in two or three dimensions an emitter in the presence of multipaths arising from the direct path and one or more reflections off obstacles whose positions are known. The paths are received on a single multi-channel reception system, likewise of known position. The method according to the invention is based on a signal processing procedure. FIG. 1 illustrates an exemplary locating system comprising a multi-sensor receiving station of known position A which receives a direct path and a path reflected off an obstacle of known position B. The two paths received are emitted by a source E whose position it is sought to locate. The receiving station of position A receives the direct path from the emitting source E at an incidence $\theta_1$ and the path reflected off the obstacle located at B at an incidence $\theta_2$. The locating of the emitter requires on the one hand an estimation of the time difference of arrival $\tau_2-\tau_1$ between the direct path and the reflected path and on the other hand an estimation of the angle of incidence $\theta_1$ of the direct path. These two problems are covered on the one hand by the field of estimation of difference in arrival time better known by the term Time Difference Of Arrival (TDOA) and on the other hand the field of goniometry or estimation of angle of arrival, known by the expression Angle of Arrival (AOA). Hereinafter in the text, we shall speak of TDOA and AOA estimation.

Figure 2:
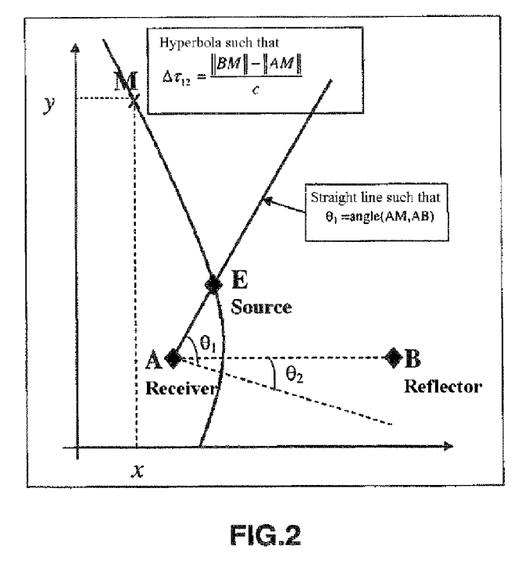

The emitter, the reflectors and the receiver possibly being fixed or in motion, it is also necessary to perform an estimation of the difference in arrival frequency of the paths or Frequency Difference Of Arrival (FDOA). FIG. 2 shows that in the presence of a reflected path, AOA/TDOA/FDOA location of an emitter at E consists first of all in estimating the time differences of arrival $\Delta\tau_{12}$ between the direct path and the reflected path so as to form a hyperbola and then in estimating the direction $\theta_1$ of the direct path so as to form a straight line. The emitter is then situated at the intersection of the straight line of direction $\theta_1$ and of the hyperbola associated with $\Delta\tau_{12}$. In the presence of several reflected paths, the emitter is situated at the intersection of several hyperbolas and of the straight line, thus rendering the AOA estimation optional.

Knowing that the receiving station implemented is composed of several sensors, the invention also relates to the field of antenna processing. In an electromagnetic context the sensors are antennas and the radio-electric sources propagate according to a polarization. In an acoustic context, the sensors are microphones and the sources are audible. The invention relates, more particularly, to the field of goniometry or AOA estimation which consists in estimating the angles of arrival of the sources, a source referring either to the direct path originating from the emitter or to a path reflected off an obstacle. The elementary sensors of the array receive the sources with a phase and an amplitude depending in particular on their angles of incidence and the position of the sensors.

Figure 3:
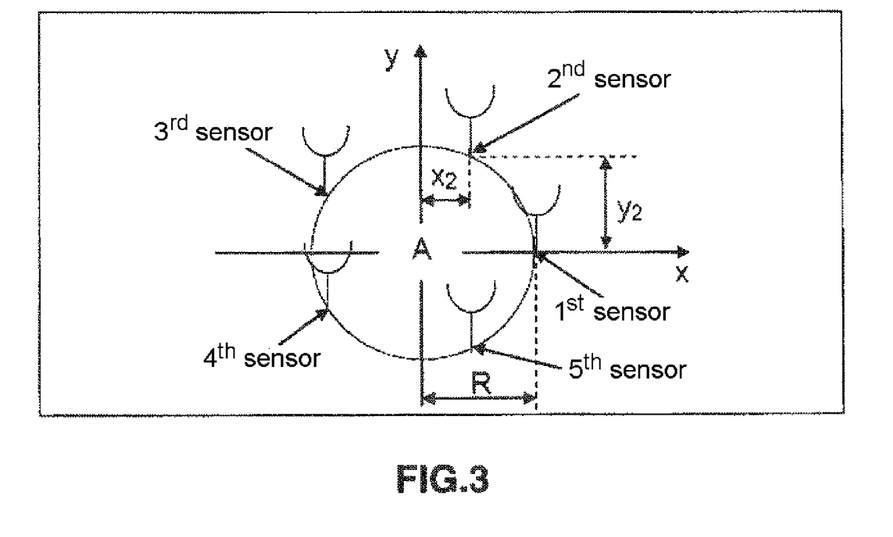

FIG. 3 represents a particular array of sensors with respective coordinates $(x_n, y_n)$. The angles of incidence are parametrized by the azimuth $\theta_m$ and the elevation $\Delta_m$. The main objective of antenna processing techniques is to utilize the spatial diversity of the signals received on the antenna array.

BACKGROUND OF THE INVENTION

The field of passive location by TDOA techniques is very vast; the procedure proposed by [1] may be cited in particular. The latter proposes a measurement which is performed on the basis of signals arising from several single-channel stations. The source of interest can then be located in two dimensions by intersection of hyperbolas with the aid of a minimum of three single-track receivers. This technique entails solving systems of non-linear equations and resorts to a procedure of linearized least squares requiring initialization close to the real position of the emitter so as not to diverge. Moreover, time synchronization of all the receivers is necessary as well as the use of a data merging center. Finally this technique is not very robust in a multipath situation and in the presence of interference. The articles [2][3] propose TDOA techniques making it possible to separate the sources on the basis of a priori knowledge of their cyclic characteristics.

Location techniques based on TDOA/FDOA measurements have been developed, in particular that cited in [4] in the case where the emitter and/or the receivers are in motion. This procedure makes it possible to reduce the useful number of receivers, but still requires synchronization.

The field of AOA estimation and location in the presence of multi-paths with the help of a multi-channel receiving station is very vast; in particular [5] may be cited.

AOA/TDOA joint estimation has generated a large number of references; for example [6] may be cited. In contradistinction to the TDOA-estimation-only procedures, the processing operations performed here are done with multi-channel receiving stations. However:
  the objective is to carry out the parametric analysis of a channel with multi-paths from a single emitter $E_1$ to a multi-channel receiving station at $A_1$. The jointly estimated parameters are then the angles of arrival $\theta_{11j}$ and the time gaps $\tau_{11j}-\tau_{11j'}$ between the paths of this same emitter due to reflectors at $R_j$ and $R_{j'}$.
  the joint estimation of the parameters $(\theta_{11j}, \tau_{11j}-\tau_{11j'})$ is very often envisaged on the basis of the knowledge of a pilot signal.

Thus in [6], the authors propose a procedure for estimating the angles of arrival and the delays of the correlated multi-paths of a source received on an antenna array. The problem is modeled by a spatio-temporal matrix parametrized by the angles and the delays sought. The propagation channel is first of all estimated blindly or with the aid of reference sequence, and then, the parameters are estimated. This technique has, however, the drawback of making assumptions about the signal emitted; it is thus assumed that the signal is digital and modulated by a known waveform. Moreover, it involves a channel estimation procedure which does not perform source location.

The state of the art closest to the invention relates to single-station location (SSL) techniques used within the framework of High Frequency (HF) transmissions. The field of HF SSL is very vast; reference [7] may be cited for example. Location is done with the aid of a single multi-channel receiving station. The reception of a path reflected off the ionosphere, coupled with the knowledge of the model of the ionosphere (altitudes of the layers), makes it possible to calculate the position of the emitter. In certain approaches, propagation delays are estimated between several paths reflected off the various layers of the ionosphere, thus circumventing the need for perfect knowledge of the model of the ionosphere in order to perform location. However, these procedures then assume that the reflections off the layers occur in the middle of the emitter/receiver distance. Moreover the drawback of these procedures is that they assume a priori knowledge of the ionosphere.

SUMMARY OF THE INVENTION

The invention proposes to alleviate the restrictions of the prior art by introducing a solution for locating a source with the aid of a single multi-channel reception system, the advantage of this being to eliminate synchronization problems when several receivers are used. Moreover, the method implemented according to the invention is based on the use of multipaths reflected off obstacles with known positions, which can be controlled and which are situated on the Earth, and does not require any particular knowledge about the characteristics of the signal received by the reception system. Finally the invention also makes it possible to handle the case of location in the presence of cyclo-stationary signals.

For this purpose, one of the objects of the present invention is to offer a method for locating an emitter E transmitting a signal toward a receiver A comprising N radio frequency channels (N≥1), the characteristics of said signal being unknown to the receiver and said signal being reflected off P reflectors $B_i$ (P≥1) of known positions, characterized in that it comprises at least the following steps:

Step 1: a step of multi-channel joint estimation/detection of the time differences of arrival or TDOA $\tau_i$ and of the frequency differences of arrival or FDOA $f_i$ of each reflected path comprising at least the following sub-steps:

Step 1.1: estimation of the autocorrelation matrix $R_{xx}(\tau, f)$ of the signal received by the receiver A, as a function of the time parameter $\tau$ and frequency parameter $f$, Step 1.2: construction of a normalized criterion $$\hat{c}_{xx}(\tau, f) = 1 - \det(I_N - \hat{R}_{xx}(0,0)^{-1}\hat{R}_{xx}(\tau, f)\hat{R}_{xx}(\tau, f)\hat{R}_{xx}(0,0)^{-1}\hat{R}_{xx}(\tau, f)^H),$$

where det is the determinant of a matrix, $I_N$ is the identity matrix with N rows and N columns and $\hat{R}_{xx}(\tau, f)$ is an estimate of the autocorrelation matrix $R_{xx}(\tau, f)$ at the points $\tau$ and $f$, Step 1.3: calculation of a detection threshold $$\eta(T, B) = \frac{\alpha(p_{fa}, 2N^2)}{2K}$$

with $K = B_{noise} T$, where $\alpha(p_{fa}, 2N^2)$ is determined by a table of the chi-2 law for a probability $p_{fa}$ and a number of degrees of freedom equal to $2N^2$.

Step 1.4: determination of the P TDOA/FDOA pairs $(\tau_i, f_i)$ which satisfy the following conditions:
$\hat{c}_{xx}(\tau_i, f_i) > \eta(T, B)$
$\hat{c}_{xx}(\tau_i, f_i)$ is a local maximum of the criterion $\hat{c}_{xx}(\tau, f)$, Step 2: a step of angular estimation of the direction $\theta_1$ of the direct path of the signal emitted by a goniometry procedure, Step 3: a step of location in the plane of the position (x,y) of the emitter E on the basis, at least, of the pairs $(\tau_i, f_i)$ or of the pairs $(\tau_i, f_i)$ and of the direction $\theta_1$, said step 3 comprising at least the following sub-steps:

Step 3.1: plotting of the P branches of hyperbolas on the basis of the knowledge of the P TDOA/FDOA pairs estimated $(\tau_i, f_i)$ for each reflected path, Step 3.2: plotting of a straight line passing through the receiver A and having angle of incidence $\theta_1$, Step 3.3: determination of the coordinates (x,y) of the emitter E by intersection of at least two curves from among the branch or branches of hyperbolas determined in step 3.1 and the straight line determined in step 3.2.

According to one embodiment the goniometry procedure of step 2 is applied to one of the P matrices $R_{xx}(\tau_i, f_i)$ relating to the path reflected off the reflector $B_i$ and the angle $\theta_1$ is the angle formed by the straight lines $(AB_i)$ and $(AE)$.

According to one embodiment the goniometry procedure of step 2 implements a joint diagonalization of the P matrices $R_{xx}(\tau_i, f_i)$ and the angle $\theta_1$ is the angle between the straight line (AE) and a reference straight line.

According to one embodiment the goniometry procedure of step 2 is a procedure of MUSIC type.

According to one embodiment the location method comprises an additional step of estimating the altitude coordinate z of the emitter E, said altitude z being determined as a function, at least, of an estimation of the elevation $\Delta_1$ of the emitter E provided by the goniometry procedure implemented in step 2.

According to one embodiment the number of reflected paths P is greater than or equal to 3 and an additional step of estimating the altitude coordinate z of the emitter E is performed, said altitude z being determined, at least, by intersection of the P hyperboloids determined on the basis of the P branches of hyperbolas obtained in step 3.1.

According to one embodiment the signal emitted by the emitter is a cyclo-stationary signal and step 1 of the method additionally comprises the following steps:

Step 1.5: construction of a filtering template g(f) on the basis of the cut of the criterion $\hat{c}_{xx}(\tau, f)$ at $\tau=0$, Step 1.6: deletion of the sidelobes of the criterion by comparing, at each detection point $(\tau, f)$ of the criterion, the value of $\hat{c}_{xx}(\tau, f)$ with said template g(f) centered at $\tau$ and by deleting any detection $(\tau, f')$ such that the value of the criterion $\hat{c}_{xx}(\tau, f')$ is less than g(f').

The subject of the invention is also a locating system comprising at least one emitter E, one or more reflectors B, and a receiving station A, said station comprising several sensors suitable for receiving a signal emitted and a processing unit comprising means for executing the steps of the method such as described previously.

BRIEF DESCRIPTION OF THE DRAWINGS

Other characteristics and advantages of the method and of the device according to the invention will be more apparent on reading the description which follows of an exemplary embodiment given by way of wholly nonlimiting illustration together with the figures which represent:

FIG. 1 a locating system comprising a reception system at A, an emitting source at E and a reflecting obstacle at B, FIG. 2 an illustration of a technique for locating a source at E by interception of a hyperbola and of a straight line, FIG. 3 an example of an array of sensors with positions $(x_m, y_m)$, FIG. 4 an example of an autocorrelation function with bounded temporal support, FIG. 5 an exemplary TDOA/FDOA criterion in the presence of a direct path and of a reflected path of a stationary signal whose autocorrelation function has bounded temporal support, FIG. 6 an illustration of the method according to the invention of multi-channel TDOA/FDOA estimation by autocorrelation, FIG. 7 a diagram of the principle of locating an emitter at E by a TDOA estimation technique, FIG. 8 an illustration of a technique for locating a source at E by interception of two hyperbolas and of a straight line, FIG. 9 an exemplary TDOA/FDOA criterion in the presence of a direct path and of two reflected paths of a signal whose autocorrelation function has bounded temporal support, FIG. 10 an exemplary TDOA/FDOA criterion in the presence of a direct path and of two reflected paths for a cyclo-stationary signal whose autocorrelation function has bounded temporal support, FIG. 11 an exemplary template for the deletion of secondary detections in the case of cyclo-stationary signals.

DETAILED DESCRIPTION

Modeling

The method according to the invention relates to the location of a source in the presence of a direct path and of $P \geq 1$ temporally decorrelated paths with the aid of an array of N elementary sensors. Said paths originate from a reflection off P obstacles of known positions. FIG. 1 illustrates the case of an array of N=6 sensors receiving the direct path and a reflected path from a source. P=1 in this case.

In the presence of a source with P−1 reflected paths, the expression for the signals received by the sensor array may be written:

$$x(t) = \begin{bmatrix} x_1(t) \\ \cdots \\ x_n(t) \\ \cdots \\ x_N(t) \end{bmatrix} = \sum_{p=1}^{P} \rho_p a(\theta_p) s_p(t - \tau_p) + n(t) = As(t) + n(t). \quad (1)$$

$$s_p(t) = s(t) \exp(j 2\pi f_p t)$$

Figure 4:
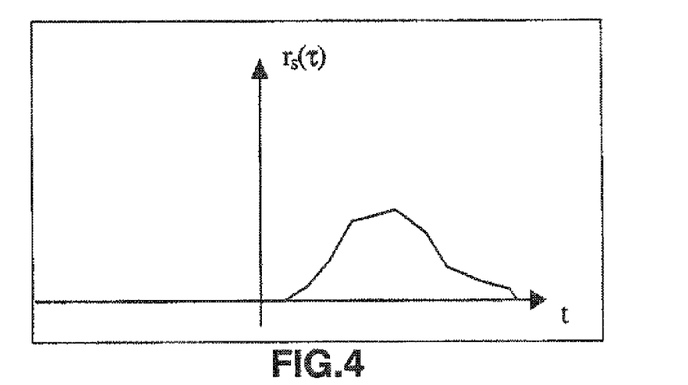

Where:
- $x_n(t)$ is the signal output by the n-th sensor,
- s(t) corresponds to the temporal signal emitted by the source. This signal may be stationary or cyclo-stationary and its autocorrelation function has bounded temporal support such as illustrated in FIG. 4.
- $\rho_p, \theta_p, \tau_p$ are respectively the attenuation, the direction and the delay of the p-th path originating from the source.
- $a(\theta)$ is the steering vector representing the response of the array of sensors to a source of direction $\theta$
- n(t) is the additive noise, the noise components are independent between reception channels and have power $\sigma^2$. The noise also comprises possible interference. It is assumed that n(t) follows a Gaussian law.
- $s(t)=[s_1(t-\tau p) \ldots s_P(t-\tau_P)]^T$ is a vector comprising the temporal signal of the direct path and that of the reflected paths.
- A is the matrix of the steering vectors, $A=[a(\theta_1) \ldots a(\theta p)]$ The term TDOA refers to the time difference of arrival $\Delta \tau_p$ between a reflected path and the direct path. The term FDOA refers to the frequency difference $\Delta f_p$ between the reflected path and the direct path. $\Delta \tau_p = \tau_p - \tau_1$ and $\tau f_p = f_p - f_1$ are the TDOA and FDOA that the invention proposes to estimate, with $\tau_1$ and $f_1$ the arrival time and the frequency of the direct path.

The steering vector $a(\theta)$ depends on the positions $(x_n, y_n)$ of the sensors, such as described in FIG. 3, and may be written:

$$a(\theta) = \begin{bmatrix} a_1(\theta) \\ \vdots \\ a_N(\theta) \end{bmatrix} \text{ with } a_n(\theta) = \exp\left(j \frac{2\pi}{\lambda}(x_n \cos(\theta) + y_n \sin(\theta))\right). \quad (2)$$

The steering vector $a(\theta)$ is normalized to $\sqrt{N}$: $a(\theta) \cdot a(\theta)^H = N$.

One of the objectives of the method according to the invention is to locate the source with the aid of an array of N sensors. The multi-channel estimation of the TDOAs makes it possible to construct hyperbolas on which the source is situated. Moreover, the direction of arrival of the direct path of the source may be estimated by goniometry techniques. The intersection of the hyperbolas and of the direction of arrival of the direct path leads to the location of the source such as is illustrated in FIG. 2.

In one embodiment, the method allows the location in two dimensions by taking into account a direct path and a reflected path for decorrelated stationary signals exhibiting an autocorrelation function with bounded temporal support.

In another embodiment, the method also allows the location in three dimensions, provided that sensors suitable for evaluating the direction of arrival of the signal in terms of azimuth and elevation are available.

The case where $P \geq 1$ reflected paths are used is also taken into account by the method, as well as the case where the signals are cyclo-stationary.

Location in the Presence of a Stationary Signal Comprising a Direct Path and a Reflected Path that are Decorrelated In a first embodiment, the signal s(t) emitted by the source is assumed to be stationary and to have an autocorrelation function with bounded temporal support. The sensor array receives two temporally decorrelated paths (the direct path and a reflected path) exhibiting a temporal shift $\Delta \tau$ and a frequency shift $\Delta f$. The method for locating the source comprises the following steps:

Step 1: a phase of multi-channel estimation and detection of the TDOAs and FDOAs,
Step 2: a phase of angular estimation of the direct path,
Step 3: a phase of locating the source.

Step 1: Multi-Channel Estimation of the TDOA and FDOA

The parameters to be estimated are the TDOA $\Delta \tau$ and the FDOA $\Delta f = f_2 - f_1$. Accordingly, it is first necessary to estimate the following autocorrelation matrix of dimensions (N,N):

$$R_{xx}(\tau, f) = \int_t E[x(t) x(t-\tau)^H] \exp(-j 2\pi f t) dt \quad (3)$$

The procedure consists in searching for the maximum of this function and in comparing said maximum with a threshold. Indeed, by assuming that the waveform of the signal emitted is not ambiguous and that the two paths are uncorrelated, that is to say that the temporal supports of their autocorrelation functions are separated, $R_{xx}(\tau, f)$ exhibits a local maximum at $\tau = \Delta \tau$ and $f = f_2 - f_1$.

Searching for and detecting the maximum of the autocorrelation function is equivalent to searching for the presence of a common source between the direct path and the reflected path at $(\Delta \tau, f_2 - f_1)$.

The multi-channel procedure for estimating the TDOA and the FDOA comprises the following four sub-steps:

Step 1.1: Estimation of the Autocorrelation Matrix

The first step of the TDOA/FDOA estimation method according to the invention consists in estimating the autocorrelation matrix $R_{xx}(\tau, f)$. The signal x(t) being observed over a finite duration $T=KT_e$ where $T_e$ is the sampling period for said signal and K a positive integer, the matrix can be estimated as follows:

$$\hat{R}_{xx}(\tau, f) = \frac{1}{K}\sum_{k=1}^{K} x(kT_e)x(kT_e - \tau)^H \exp(-j2\pi f kT_e). \quad (4)$$

Step 1.2: Construction of the Normalized Criterion

The following normalized criterion is constructed on the basis of the estimate calculated in the previous step:

$$\hat{c}_{xx}(\tau,f) = 1 - \det(I_N - \hat{R}_{xx}(0,0)^{-1}\hat{R}_{xx}(\tau,f)\hat{R}_{xx}(0,0)^{-1}\hat{R}_{xx}(\tau,f)^H) \quad (5)$$

Figure 5:
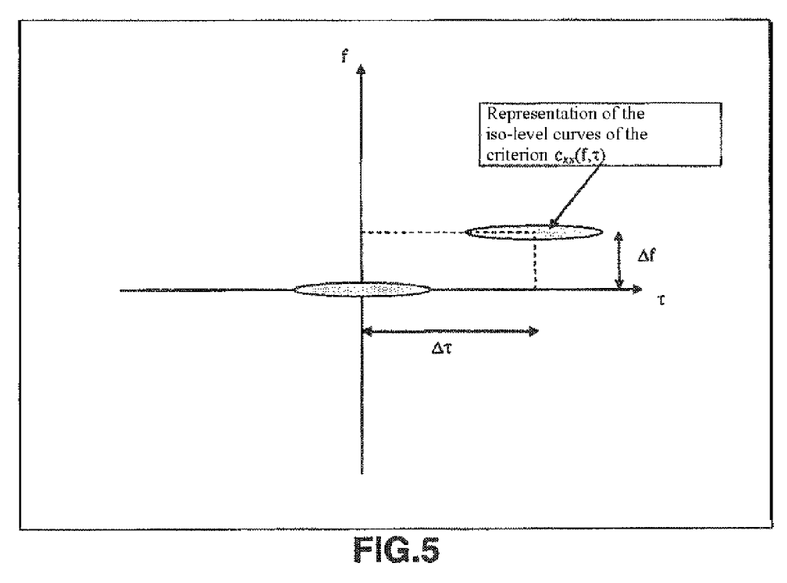

The method consists in evaluating this two-dimensional criterion on the pairs of parameters $(\tau_i, f_j)$ with $\tau_i$=i.inc_$\Delta\tau$ and $f_j$ j.inc_$\Delta f$, where inc_$\Delta\tau$ and inc_$\Delta f$ are increments whose value is predefined, and in comparing it with a threshold $\eta(T, B)$. FIG. 5 illustrates a representation in the plane $(\tau, f)$ of a cut, for a given threshold value, of the criterion $\hat{c}_{xx}(\Delta\tau, \Delta f)$ Step 1.3: Calculation of the Threshold The threshold $\eta(T, B)$ is based on the knowledge of the statistics of the following likelihood ratio:

$$V = -2K\ln(1 - \hat{c}_{xx}(\tau, f)) \quad (6)$$
$$= -2K\ln(\det(I_N - \hat{R}_{xx}(0, 0)^{-1}\hat{R}_{xx}(\tau, f)\hat{R}_{xx}(0, 0)^{-1}\hat{R}_{xx}(\tau, f)^H)).$$

The latter follows a chi-2 law with $2N^2$ degrees of freedom in the presence of Gaussian noise only. Consequently it is considered that a reflected path has been detected at $(\tau_i, f_j)$ when:

$$-2K\ln(1-\hat{c}_{xx}(\tau_i,f_j)) > \alpha(p_{fa}, 2N^2) \quad (7)$$

$\alpha$(proba,d) is determined by a chi-2 table for a probability of proba and a number of degrees of freedom of d. The threshold $\eta(T, B)$ such that $\hat{c}_{xx}(\tau, f) \leq$ or $\geq \eta(T, B)$ therefore has the following expression:

$$\eta(T, B) = 1 - \exp\left(-\frac{\alpha(p_{fa}, 2N^2)}{2K}\right) \text{ with } K = B_{noise}T. \quad (8)$$

With $p_{fa}$, a given false alarm probability.

By assuming that the product $K=B_{noise}T$ is sufficiently large, the previous threshold becomes:

$$\eta(T, B) = \frac{\alpha(p_{fa}, 2N^2)}{2K} \text{ with } K = B_{noise}T. \quad (9)$$

Step 1.4: Detection/Estimation

Figure 6:
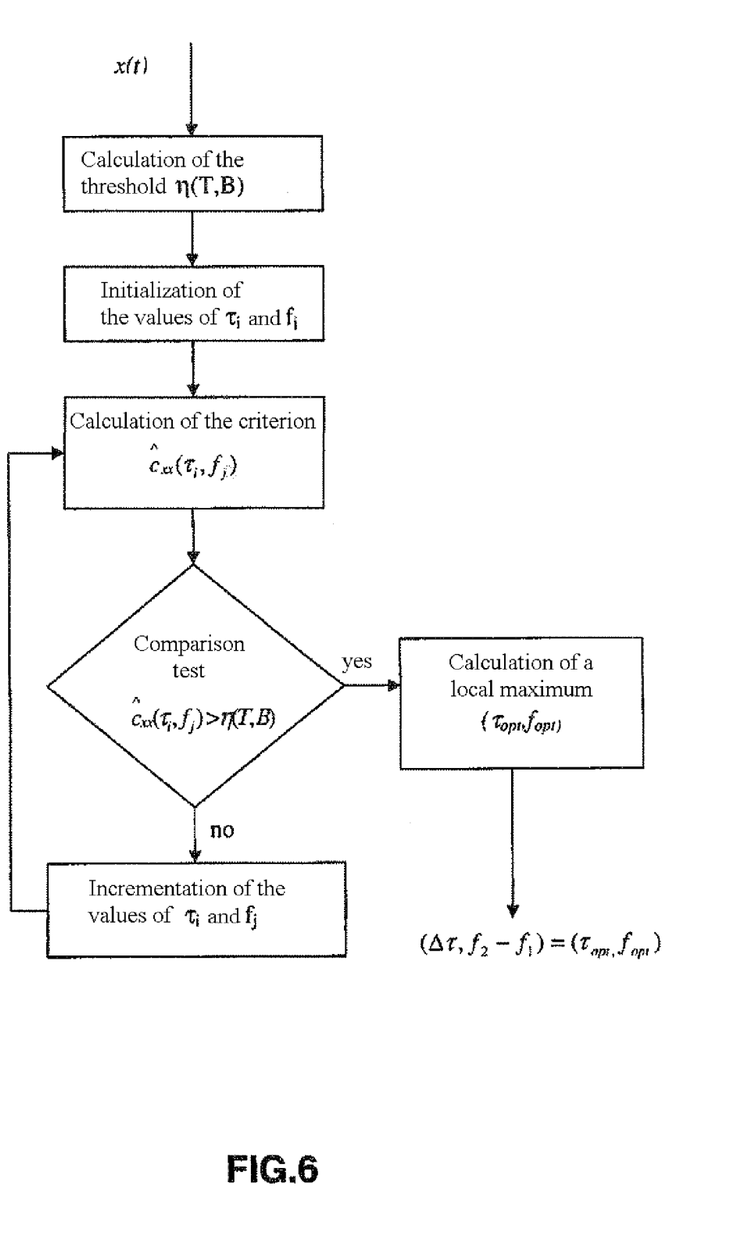

The presence of a reflected path at $(\tau_i, f_i)$ is detected when:
$\hat{c}_{xx}(\tau_i, f_i) > \eta(T,B)$
$\hat{c}_{xx}(\tau_i, f_i)$ exhibits a local maximum FIG. 6 shows diagrammatically the method implemented to determine the TDOA/FDOA estimates on the basis of the calculation of the normalized criterion and of the detection threshold.

In a variant embodiment, the estimation of the TDOA/FDOA pair $(\tau_i, f_i)$ may be refined by parabolic interpolation of the criterion $\hat{c}_{xx}(\tau, f)$.

The following step of the method consists in estimating the angle of arrival of the direct path.

Step 2: Angular Estimation (AOA)

On completion of step 1, the TDOA and FDOA estimates $(\hat{\tau}_i, \hat{f}_i)$ of the reflected path are available. Given that the positions of the receiver and of the reflector are known, and that the antennas have been pre-calibrated, the steering vector $a(\theta_2)$ of the reflected path is also known. The angular estimation then consists in estimating the direction of arrival $\theta_1$ of the direct path (azimuth of the source).

In a variant embodiment, if the antennas of the receiving station are suitable for processing signals in three dimensions, step 2 of the method will also consist in estimating the elevation $\Delta_1$ of the source which emits the direct path.

Step 2.1: Estimation of the Direction of Arrival of the Direct Path

The method consists in using a goniometry procedure to estimate the direction of arrival of the direct path. A procedure known to the person skilled in the art that can be applied here is the MUSIC procedure, such as described in [8], which uses the autocorrelation matrix $R_{xx}(\tau, f)$ at the previously determined detection point $(\hat{\tau}_i, \hat{f}_i)$.

Knowing that the matrix is modeled by:

$$R_{xx}(\hat{\tau}_i, \hat{f}_i) = a(\theta_1)r_s(0,0)a(\theta_2)^H,$$

where $r_s(\tau, f)$ is the autocorrelation function of the signal s(t). It suffices to apply the MUSIC procedure to $R_2=R_{xx}(\tau_i, f_i)R_{xx}(\tau_i, f_i)^H$, assuming the presence of a single source.

Other goniometry procedures can, of course, be envisaged.

In the case where the antennas of the receiver are suitable for processing signals in three dimensions, a goniometry procedure which also makes it possible to estimate the elevation of the direct path can be used.

The last step of the method according to the invention consists in using the estimates of the TDOA, FDOA and AOA (azimuth and optionally elevation) to locate the source.

Step 3: Location of the Source

In the case where the processing operations are done in two dimensions, the source is located through the interception of a hyperbola with a straight line. The hyperbola is constructed on the basis of the TDOA estimate (Step 1) while the straight line is obtained on the basis of the angular estimation of the source (Step 2).

Step 3.1: Plotting of the Hyperbola Branch

Figure 7:
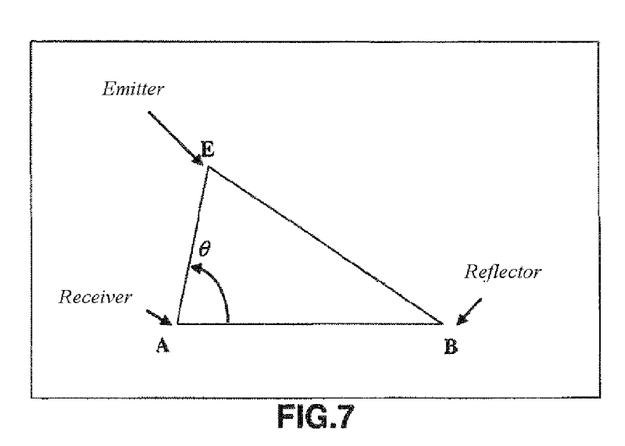

FIG. 7 shows diagrammatically the principle of locating an emitter with position E via the estimation of the TDOA in the presence of a receiver with position A and of a reflector with position B.

$\|BA\|$ is the distance between the points A and B. The distance $D=\Delta\tau*c$, where c is the speed, is calculated on the basis of the estimation of the time difference $\Delta\tau$ between the two paths (TDOA). Consequently the point E belongs to the curve of the points M(x,y), defined by the following equation:

$$D = \|MB\| + \|BA\| - \|MA\| \quad (10)$$

Where the point M with coordinates (x,y) is one of the points of this curve. Said coordinates satisfy:

$$x = x_A + \frac{D(D - 2\|BA\|)}{2(\|BA\|(1 - \cos(\theta)) - D)}\cos(\theta) \text{ and} \quad (11)$$

-continued $$y = y_A + \frac{D(D - 2\|BA\|)}{2(\|BA\|(1 - \cos(\theta)) - D)} \sin(\theta)$$

Where $(x_A, y_A)$ are the coordinates of the point A. FIG. 2 gives an exemplary hyperbola for the location of the point E whose equations are given at (10) and (11).

In the case where one seeks to perform location of the source in three dimensions, step 3.1 is then aimed at constructing a branch of a hyperboloid rather than of a hyperbola. This hyperboloid branch can be obtained in a similar manner to the case described for location in two dimensions, doing so solely on the basis of the value of the TDOA estimate.

Step 3.2: Plotting of the Straight Line

This sub-step consists in plotting the straight line passing through the receiver and forming the angle $\theta_1$ with the straight line joining the receiver to the reflector such as illustrated in FIG. 2. In the case of 3D location, the straight line is defined by the angles of azimuth $\theta_1$ and of elevation $\Delta_1$.

Step 3.3: Location of the Source

The latter step makes it possible to obtain the position of the source through the intersection between the hyperbola determined in step 3.1 and the straight line determined in step 3.2.

In a variant embodiment, when location is performed in three dimensions, the position of the source is, additionally, defined by the elevation determined in step 2.2.

Location in the Presence of a Stationary Signal Comprising a Direct Path and P Reflected Paths that are Decorrelated The method described previously may be extended to an embodiment where several (P) decorrelated reflected paths are received by the receiving station. The signal considered is still stationary and its autocorrelation function has bounded temporal support.

Figure 9:
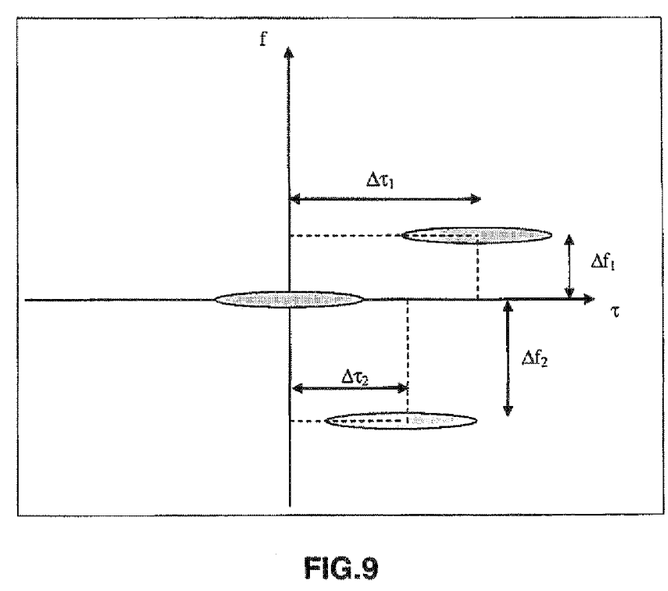

The steps of the method are functionally identical to the case described previously (a single reflected path):

Step 1: Multi-Channel Estimation of the TDOAs and FDOAs of the P Reflected Paths In the presence of P>1 decorrelated reflected paths and a direct path, for $\tau>0$, $f>0$ the matrix $R_{xx}(\tau, f)$ exhibits local maxima at the points $(\tau_i, f_i), i\in[1, P]$. The procedure explained previously for a reflected path remains valid for estimating the TDOAs/FDOAs of each of the P reflected paths. For this purpose, sub-steps 1.1, 1.2, 1.3 and 1.4 are implemented such as previously described. FIG. 9 illustrates a representation in the $(\tau, f)$ plane of a cut, for a given threshold value, of the criterion $\hat{c}_{xx}(\Delta\tau, \Delta f)$ for the case where P=2 reflected paths are considered. The local maxima determined at the points $(\Delta\tau_1, \Delta f_1)$ and $(\Delta\tau_2, \Delta f_2)$ correspond to the two reflected paths, whereas the direct path exhibits a local maximum at the origin (0,0).

Step 2: Angular Estimation of the Direct Path.

On completion of the previous step 1, P TDOA/FDOA pairs $(\hat{\tau}_i, \hat{f}_i)$ are available for the reflected paths, for i varying from 1 to P. Given that the positions of the receiver and of the reflectors are known, and that the antenna has been calibrated beforehand, steering vectors $\hat{a}(\theta^i_{MT})$ are available for all the reflected paths. The angular estimation then consists in estimating the direction of arrival of the direct path.

Step 2.1 bis: Estimation of the Direction of Arrival in Terms of Azimuth $\theta_1$ of the Direct Path The method consists in using a goniometry procedure to estimate the direction of arrival of the direct path. For example, the MUSIC procedure may be implemented on the P matrices $R_{xx}(\tau, f)$ at the detection points $(\hat{\tau}_i, \hat{f}_i)$. Knowing that the matrices are modeled by:

$R_{xx}(\hat{\tau}_i, \hat{f}_i) a(\theta_1) r_s(0,0) a(\theta^i_{MT})^H$ where $a(\theta^1_{MT})$ is the steering vector of the $i^{th}$ reflected path. The MUSIC procedure is applied to each matrix $R_2 = R_{xx}(\tau_i, f_i) R_{xx}(\tau_i, f_i)^H$, assuming the presence of a single source.

The estimation of the direction of arrival of the direct path can then be done on a single of the P matrices $R_{xx}(\hat{\tau}_i, \hat{f}_i)$ (rendering step 2.1bis identical to step 2.1 described previously) or else by performing a joint diagonalization on the whole set of these P matrices, this having the advantage of obtaining better precision for the direction of arrival. In the latter case, the estimation of the direction of arrival of the direct path is done via the estimation of the angle $\theta_{TD}$ between said direct path joining the source to the receiver and a reference point which may be, for example, geographical North.

Step 2.2 bis: Estimation of the Direction of Arrival in Terms of Elevation of the Direct Path In the case where the antennas of the receiver are suitable for processing signals in three dimensions, a goniometry procedure can also be applied to estimate the elevation of the direct path. The goniometry procedure may be, for example, a MUSIC procedure.

Step 3: Location of the Source

In order to locate the source (in the plane or space), P hyperbolas with a branch corresponding to the P reflected paths are then available. In a manner analogous to the case of a single reflected path, the intersection of these hyperbolas and of the straight line obtained by angular estimation of the direct path makes it possible to locate the source in the plane. By using as additional item of information, the elevation of the source determined in step 2.2, location can also be done in space. The sub-steps similar to that of the case of a single reflected path are implemented:

Step 3.1 bis: plotting of the branches of hyperbolas for location in two dimensions, or of the hyperboloids for location in three dimensions.

Step 3.2: plotting of the straight line corresponding to the direction of the direct path. This step is identical to the case of a single reflected path.

Figure 8:
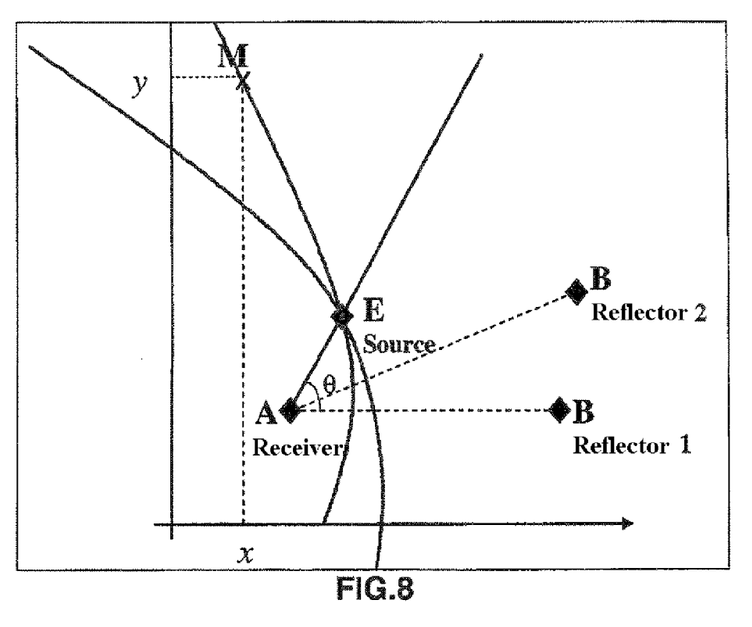

Step 3.3 bis: This step consists in using the various elements produced in the previous steps to estimate the position of the source in the plane or space. Several variants are possible:

Location in the plane by intersection of the P hyperbolas and of the straight line. FIG. 8 illustrates this case for P=2.

Location in the plane by intersection of at least 2 hyperbolas out of the P available. In this case, step 3.2 is optional.

Location in space by intersection of the P hyperboloids and of the straight line defined by estimating the azimuth and the elevation of the direct path.

Location in space by intersection of at least 3 hyperboloids out of the P available (assuming P>3). In this case step 3.2 is also optional.

Location in the Presence of a Cyclo-Stationary Signal Comprising a Direct Path and P Reflected Paths that are Decorrelated, P>0

The previously described method according to the invention takes as assumption the case of stationary signals. The method can also be implemented on cyclo-stationary signals by introducing two additional steps.

In the same manner as previously, the paths are decorrelated and the autocorrelation function of the signal has bounded temporal support.

Figure 10:
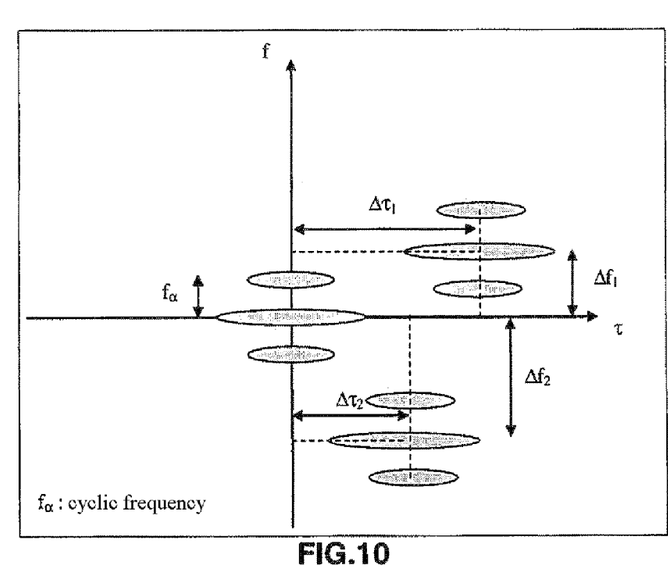

The first step of multi-track estimation of the TDOAs/FDOAs of the reflected path or paths is similar to step 1 described previously. The signals now being assumed cyclo-stationary, their autocorrelation function $R_{xx}(\tau, f)$ and consequently the criterion $\hat{c}_{xx}(\tau, f)$ exhibits nonzero values at the level of the cyclic frequencies of the signal. FIG. 10 gives an exemplary criterion for a cyclo-stationary signal in the presence of P=2 reflected paths and a direct path. Steps 1.1 to 1.4 can therefore lead to the detection not only of the TDOA/FDOA pairs sought $(\hat{\tau}_i, \hat{f}_i)$ but also of the pairs $(\hat{\tau}_i, \hat{f}_i-kf_\alpha)$ and $(\tau_i, \hat{f}_i+kf_\alpha)$, k a positive integer, corresponding to the secondary peaks where $f_\alpha$ is the cyclic frequency of the signal.

The method according to the invention then consists in using a filtering template to delete the secondary detections. The two additional steps are therefore implemented:

Step 1.5: Construction of the Filtering Template

Figure 11:
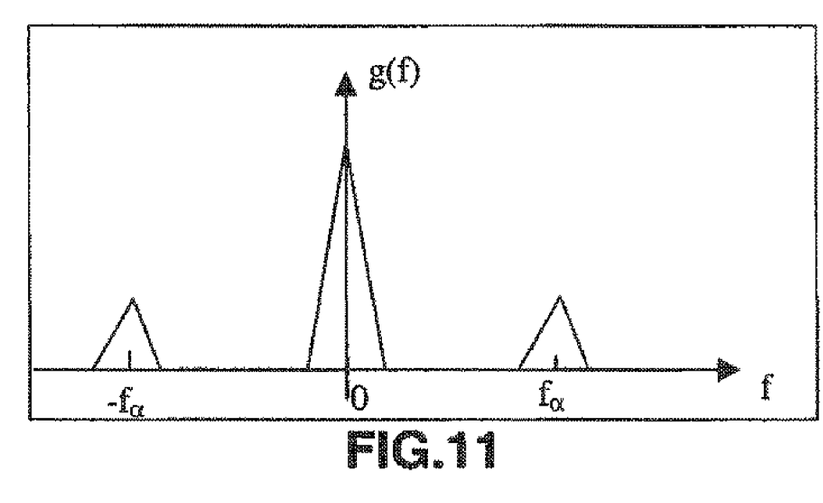

The cut of the criterion $\hat{c}_{xx}(\tau, f)$ at $\tau=0$ makes it possible to construct a frequency-dependent filtering template g(f). The template then corresponds to this cut plus a multiplicative factor. FIG. 11 gives an exemplary template.

Step 1.6: Deletion of the Secondary Detections

The method according to the invention thereafter consists in comparing at each detection point $(\tau, f)$ of the criterion, and along the frequency axis, the value of $\hat{c}_{xx}(\tau, f)$ with the template g(f) centered at $\tau$. Any detection $(\tau, f)$ such that the value of the criterion $\hat{c}_{xx}(\tau, f)$ is less than g(f) is then deleted. The following steps of angular estimation (step 2) and of location in two or three dimensions (step 3) are identical to those described previously.

The invention applies notably to devices whose objective is to locate emitters in a controlled context of propagation. For example, it can relate to the locating of fixed or portable emitters in a urban or sub-urban setting. The invention can also be implemented within the framework of a processing associated with a passive radar with the aim of locating a target on the basis of the knowledge of an emitting source of known position such as a Digital Terrestrial Television antenna, for example. In this case, the target plays the role of reflector, whereas the emitter has a known position.

The method can then be applied by exchanging the roles of the emitter and of the reflector.

The invention presents notably the following advantages:
- 2D or 3D location of an emitter is possible by using a single multi-channel receiving station. The proposed solution does not make it necessary to perform temporal synchronization between several receivers,
- The processing operations performed do not require any a priori information about the signal emitted,
- A goniometry procedure is not necessary when two reflectors (in 2D) or three (in 3D) are present, rendering any antenna calibration phase irrelevant.
- The case of cyclo-stationary signals is also taken into account

REFERENCES

[1] Drake, S; Dogancay, K, Geolocation by time difference of arrival using hyperbolic asymptotes, ICASSP '04, vol 2, pp ii-361-4
[2] Gardner, W. A.; Chen, C.-K. Signal-selective time-difference-of-arrival estimation for passive location of man-made signal sources in highly corruptive environments. I. Theory and method IEEE trans on SP vol 40 n° 5 May 1992, pp 1168-1184
[3] Chen, C.-K.; Gardner, W. A. Signal-selective time-difference of arrival estimation for passive location of man-made signal sources in highly corruptive environments. II. Algorithms and performance IEEE trans on SP vol 40 n° 5 May 1992, pp 1168-1184
[4] D. Musicki, W. Koch, Geolocation using TDOA and FDOA measurements, 11th International Conference on Information Fusion, 2008, pp 1-8
[5] R O. SCHMIDT, Multiple emitter location and signal parameter estimation, in Proc of the RADC Spectrum Estimation Workshop, Griffiths Air Force Base, New York, 1979, pp. 243-258.
[6] Van Der Veen, M, Papadias, C. B., Paulraj, A. J., Joint angle and delay estimation(JADE) for multipath Signals Arriving at an Antenna Array, IEEE Communications Letters vol. 1-1 (January 1997), 12-14.
[7] Y. Bertel; F. Marie, An Operational HF System for Single Site Localization, IEEE 2007
[8] Optimality of high resolution array processing using the eigensystem approach Bienvenu, G.; Kopp, L.; Acoustics, Speech and Signal Processing, IEEE Transactions Volume 31, Issue 5, October 1983 Page(s):1235-1248

The invention claimed is:

1. A method for locating an emitter that transmits a signal toward a receiver, the receiver comprising N radio frequency receiving channels, where N is an integer equal to or greater than one, said signal being unknown to the receiver and said signal being reflected off a plurality P of reflectors of known positions, where P is an integer greater than one, the method comprising:

performing multi-channel joint estimation and detection of time differences of arrival $\tau_i$ and of frequency differences of arrival $f_i$ of each reflected path of said signal among a plurality of reflected paths off said plurality P of reflectors by:

estimating an autocorrelation matrix $R_{xx}(\tau,f)$ of the signal received by the receiver as a function of a time difference of arrival $\tau$ and a frequency difference of arrival f;

constructing a normalized criterion using the formula:

$\hat{c}_{xx}(\tau,f)=1-\det(I_N-\hat{R}_{xx}(0,0)^{-1}\hat{R}_{xx}(\tau,f)\hat{R}(0,0)^{-1}\hat{R}_{xx}(\tau,f)^H)$, where det is a determinant of a matrix, $I_N$ is an identity matrix with N rows and N columns, and $\hat{R}_{xx}(\tau,f)$ is an estimate of the autocorrelation matrix $R_{xx}(\tau,f)$;

calculating a detection threshold $$\eta(T, B) = \frac{\alpha(p_{fa}, 2N^2)}{2K},$$

where $K=B_{noise}T$, and where $\alpha(p_{fa}, 2N^2)$ is determined by a table of chi-2 law for a probability $p_{fa}$ and a number of degrees of freedom equal to $2N^2$; and determining a plurality P pairs $(\tau_i, f_i)$ that satisfy:

$\hat{c}_{xx}(\tau_i, f_i) > \eta(T,B)$, where $\hat{c}_{xx}(\tau_i, f_i)$ is a local maximum of a criterion $\hat{c}_{xx}(\tau,f)$;

performing angular estimation of an angular direction $\theta_1$ of a direct path of the signal by a goniometry procedure; and determining a location, in two dimensions, of a position (x,y) of the emitter based on the plurality P of pairs $(\tau_i, f_i)$, or based on the plurality P of pairs $(\tau_i, f_i)$ and the angular direction $\theta_1$, by:

plotting a plurality P of branches of hyperbolas based on the plurality P pairs estimated $(\tau_i, f_i)$ for each reflected path of said signal;

plotting a straight line passing through the receiver and having as an angle of incidence said angular direction $\theta_1$; and determining the position (x,y) of the emitter based on an intersection of at least two curves from among one or more of the plurality P branches of hyperbolas and the straight line.

2. The method of claim 1, wherein the goniometry procedure is applied to one or more of P matrices $R_{xx}(\tau_i, f_i)$ relating to a path reflected off a reflector, and the angular direction $\theta_1$ is the angle formed by the straight lines $(AB_i)$ and $(AE)$, where A is a position of the receiver, E is the position of the emitter, and $B_i$ is a position of the reflector.

3. The method of claim 1, wherein the goniometry procedure implements a joint diagonalization of P matrices $R_{xx}(\tau_i, f_j)$, and the angular direction $\theta_1$ is the angle between the straight line (AE) and a reference straight line, where A is a position of the receiver and E is the position of the emitter.

4. The method of claim 1, wherein the goniometry procedure is implemented with a Multiple Signal Classification procedure.

5. The method of claim 1, further comprising:
estimating an altitude coordinate of the emitter, wherein said altitude coordinate is based on an estimation of an elevation of the emitter provided by the goniometry procedure.

6. The method of claim 1, wherein the number P of reflected paths is greater than or equal to 3, the method further comprising:
estimating an altitude coordinate of the emitter based on an intersection of P hyperboloids determined based on the plurality P branches of hyperbolas.

7. The method of claim 1, wherein the signal emitted by the emitter is a cyclo-stationary signal, the method further comprising:
constructing a filtering template g(f) based on a cut of the criterion $\hat{c}_{xx}(\tau, f)$ at $\tau=0$; and
deleting sidelobes of the criterion by:
comparing, at each detection point $(\tau, f)$ of the criterion, a value of $\hat{c}_{xx}(\tau, f)$ with said filtering template g(f) centered at $\tau$; and
deleting detections $(\tau, f')$ corresponding to a criterion $\hat{c}_{xx}(\tau, f')$ having a value less than g(f).

8. A locating system, comprising:
at least one emitter;
one or more reflectors; and
a receiving station, said receiving station comprising several sensors suitable for receiving a signal emitted by said at least one emitter and a processing unit configured to execute the method of claim 1.

* * * * *

UNITED STATES PATENT AND TRADEMARK OFFICE
CERTIFICATE OF CORRECTION

PATENT NO.        : 8,718,674 B2
APPLICATION NO. : 13/141657
DATED             : May 6, 2014
INVENTOR(S)       : Germond et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twenty-ninth Day of September, 2015

Michelle K. Lee
*Director of the United States Patent and Trademark Office*